(12) United States Patent
Chang

(10) Patent No.: US 8,907,575 B2
(45) Date of Patent: Dec. 9, 2014

(54) LIGHT SOURCE DEVICE WITH LIGHT-EMITTING DIODE MODULE

(71) Applicant: Rui Teng Opto Technology Co., Ltd., Pingzhen, Taoyuan County (TW)

(72) Inventor: Chih-Yang Chang, Taoyuan County (TW)

(73) Assignee: Rui Teng Opto Technology Co., Ltd., Pingzhen, Taoyuan County (TW)

( * ) Notice: Subject to any disclaimer, the term of this patent is extended or adjusted under 35 U.S.C. 154(b) by 0 days.

(21) Appl. No.: 14/175,547

(22) Filed: Feb. 7, 2014

(65) Prior Publication Data

US 2014/0159594 A1 Jun. 12, 2014

Related U.S. Application Data

(63) Continuation-in-part of application No. 13/289,526, filed on Nov. 4, 2011, now abandoned, which is a continuation-in-part of application No. 12/421,460, filed on Apr. 9, 2009, now abandoned.

(30) Foreign Application Priority Data

Sep. 12, 2008 (TW) .............................. 97216582 A

(51) Int. Cl.
*H05B 37/00* (2006.01)
*H05B 33/08* (2006.01)

(52) U.S. Cl.
CPC ........ *H05B 33/0812* (2013.01); *H05B 33/0806* (2013.01)
USPC ...................... 315/185 R; 315/291

(58) Field of Classification Search
USPC ............................................... 315/185 R, 291
See application file for complete search history.

(56) References Cited

U.S. PATENT DOCUMENTS

| 6,489,728 | B2 | 12/2002 | Guthrie et al. | |
|---|---|---|---|---|
| 6,870,148 | B2 | 3/2005 | Dietz et al. | |
| 7,339,323 | B2 * | 3/2008 | Bucur | 315/128 |
| 7,714,520 | B2 * | 5/2010 | Liu | 315/291 |
| 7,872,621 | B2 | 1/2011 | Lee | |
| 8,471,493 | B2 | 6/2013 | Yem et al. | |
| 2004/0056608 | A1 | 3/2004 | Dietz et al. | |
| 2005/0243022 | A1 * | 11/2005 | Negru | 345/46 |
| 2006/0244620 | A1 | 11/2006 | Sotiriou | |
| 2011/0320998 | A1 | 12/2011 | Perry et al. | |

* cited by examiner

*Primary Examiner* — Thuy Vinh Tran
(74) *Attorney, Agent, or Firm* — Muncy, Geissler, Olds & Lowe, P.C.

(57) ABSTRACT

A light source device with an LED module includes a load module. The load module includes a voltage-regulating unit and a constant current controlling unit parallel-connected between a first output end and a second output end of the voltage-regulating unit. An input end of the voltage-regulating unit is connected to a positive end of a voltage source. The voltage-regulating unit generates a stable voltage difference of less than 1.6V between the first and second output ends. The LED module receives a residual voltage equal to the result of subtracting from the output voltage of the voltage source the voltage difference consumed by the load module. The amount by which the residual voltage exceeds the operating voltage required for the entire LED string never exceeds safe voltage values. Even if a voltage source changes, the voltage-regulating unit can still generate a stable voltage difference and a stable current.

9 Claims, 2 Drawing Sheets

LIGHT SOURCE DEVICE WITH LIGHT-EMITTING DIODE MODULE

CROSS-REFERENCE TO RELATED APPLICATION

This application is a continuation-in-part (CIP) of co-pending U.S. application Ser. No. 13/289,526, filed on Nov. 4, 2011, which is a Continuation-in-Part of U.S. application Ser. No. 12/421,460, filed Apr. 9, 2009, now abandoned, for which priority is claimed under 35 U.S.C. §120; and this application claims priority of Application No. 097216582, filed in Taiwan, R.O.C. on Sep. 12, 2008, under 35 U.S.C. §119, the entire contents of all of which are hereby incorporated by reference.

FIELD OF THE INVENTION

The present invention relates to light source devices, and more particularly, to a light source device with a light-emitting diode module (LED module).

BACKGROUND OF THE INVENTION

FIG. 1 is a circuit diagram of a conventional LED light source module 10. As shown in the FIG. 1, the conventional LED light source module 10 includes a plurality of light-emitting units 11 each connected to a direct-current (DC) voltage source 12 in parallel. Each of the light-emitting units 11 includes a resistor 111 and a plurality of LEDs 112, wherein the LEDs 112 and the resistor 111 are connected in series so that the LEDs 112 can be powered on by the DC voltage from the DC voltage source 12 and emit light.

Referring to FIG. 1, in case of stable voltage from the DC voltage source 12, the magnitude of current entering the LEDs 112 in each light-emitting unit 11 is constant under the control of the resistor 111 series-connected to the LEDs 112, so the LEDs 112 emit light steadily.

However, a slight fluctuation in the voltage from the DC voltage source 12 will result in significant variation in the current entering the light-emitting units 11. The unstable current not only has a destabilizing effect on the luminance of light emitted by the LEDs 112 in the light-emitting units 11, but also causes the LEDs 112 to generate heat unsteadily, which may in turn shorten the service lives of the LEDs 112.

SUMMARY OF THE INVENTION

It is an objective of the present invention to provide a light source device for supplying a stable current to light-emitting diodes (LED).

Another objective of the present invention is to provide a low-cost light source device with an LED module.

In order to achieve the above and other objectives, the present invention provides a light source device with a light-emitting diode module (LED module), comprising: a load module comprising a voltage-regulating unit and a constant current controlling unit parallel-connected between a first output end and a second output end of the voltage-regulating unit, wherein an input end of the voltage-regulating unit is connected to a positive end of a voltage source, and the voltage-regulating unit generates a stable voltage difference between the first output end and the second output end, the voltage difference being less than 1.6V; the LED module connected between the second output end of the voltage-regulating unit and a negative end of the voltage source to receive a residual voltage equal to a result of subtracting from the output voltage of the voltage source the voltage difference consumed by the load module, wherein the LED module has at least an LED string including a plurality of LEDs connected in series, wherein an operating voltage required for the at least an LED string in its entirety is less than or equal to the residual voltage. The amount by which the residual voltage exceeds the operating voltage required for the at least an LED string in its entirety does not exceed a safe voltage value. The constant current controlling unit provides a resistance value. The constant current controlling unit is configured by the resistance value in accordance with the result expressed as follows: the resistance value=(the voltage difference generated by the voltage-regulating unit)/(the operating current required by the LEDs).

In an embodiment of the present invention, the voltage-regulating unit is a low-dropout (LDO) regulator.

In an embodiment of the present invention, the constant current controlling unit is a resistor.

In an embodiment of the present invention, the LED module has a plurality of LED strings connected in parallel.

In an embodiment of the present invention, the safe voltage value equals 10V.

In an embodiment of the present invention, the voltage difference being less than 1.1V.

Accordingly, a light source device of the present invention is characterized in that: a load module steadily consumes a voltage difference to allow a constant current controlling unit to control and maintain a constant output current value, supply a stable current to an LED module, protect the LED module against overcurrent-induced damage, and prevent the LED module from incurring variations otherwise caused by a tiny variation of the output voltage of a voltage source. The present invention further discloses a voltage-regulating unit, a constant current controlling unit, a voltage difference, a residual voltage value, and a safe voltage value to achieve the following advantages: the LED module of the light source device supplies a stable current; and the light source device has a low-cost voltage-regulating unit, such as a low-dropout (LDO) regulator, for use in generating a stable current efficiently.

DETAILED DESCRIPTION OF THE PREFERRED EMBODIMENTS

Objectives, features, and advantages of the present invention are hereunder illustrated with specific embodiments in conjunction with the accompanying drawings.

Figure 1:
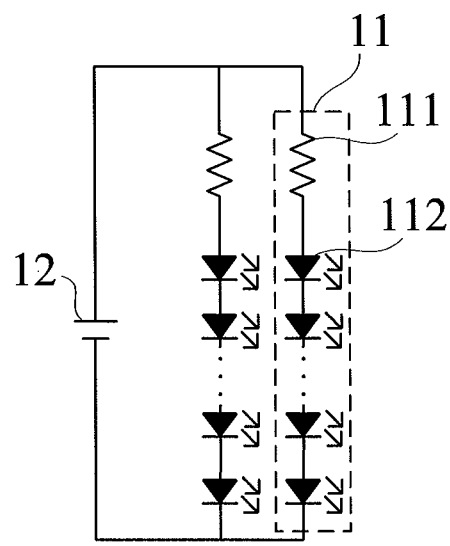
FIG. 1 is a circuit diagram of a conventional LED light source module.
Figure 2:
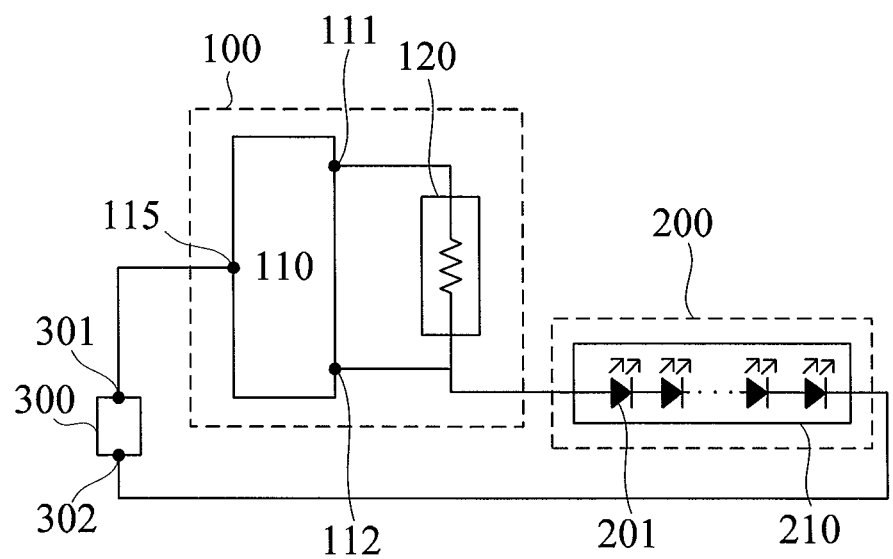
FIG. 2 is a schematic view of a light source device with a light-emitting diode module (LED module) according to an embodiment of the present invention.

Referring to FIG. 2, there is shown a schematic view of a light source device with a light-emitting diode module (LED module) according to an embodiment of the present invention. According to the present invention, a light source device with a light-emitting diode module (LED module) comprises a load module 100 and an LED module 200. The load module 100 receives an output voltage from a voltage source 300 and controls the output voltage so as to supply a stable current to the LED module 200.

The load module 100 comprises a voltage-regulating unit 110 and a constant current controlling unit 120. The voltage-regulating unit 110 has an input end 115, a first output end 111, and a second output end 112. The input of the constant current controlling unit 120 is connected to the first output end 111, whereas the output of the constant current controlling unit 120 is connected to the second output end 112; hence, the constant current controlling unit 120 is parallel-connected between the first output end 111 and the second output end 112 of the voltage-regulating unit 110. The input end 115 of the voltage-regulating unit 110 is connected to a positive end 301 of the voltage source 300 to receive the output voltage of the voltage source 300. The constant current controlling unit 120 is exemplified by a resistor (shown in FIG. 2.)

The voltage-regulating unit 110 generates a stable voltage difference between the first output end 111 and the second output end 112. In an embodiment of the present invention, the voltage difference must be less than 1.6V, and the voltage difference is preferably to be less than 1.1V. The voltage-regulating unit 110 is exemplified by a low-dropout (LDO) regulator.

The LED module 200 has at least an LED string 210 (provided in the number of one as shown in FIG. 2 for an illustrative purpose), wherein each LED string 210 consists of a plurality of LEDs 201 connected in series. The LED module 200 is connected between the second output end 112 of the voltage-regulating unit 100 and a negative end 302 of the voltage source 300 to receive a residual voltage equal to the result of subtracting the voltage difference (consumed by the load module 100) from the output voltage of the voltage source 300. The present invention is designed to generate a stable voltage by means of the load module 100 and thereby further generate a stable current to be supplied to the LED module 200. That is to say, the generation of the stable current is effectuated by means of the load module 100 for use in load-based power consumption as disclosed in the present invention; hence, under the operating voltage required for the LED string 210 in its entirety, it is feasible to configure the residual voltage appropriately in accordance with the voltage difference of the load module 100. For example, the operating voltage required for the LED string 210 in its entirety is less than or equal to the residual voltage.

Furthermore, in an embodiment of the present invention, the amount by which the residual voltage exceeds the operating voltage required for the entire LED string 210 must not exceed a safe voltage value. The safe voltage value is preferably set to 6V through 10V. The constant current controlling unit 120 provides a resistance value. The constant current controlling unit 120 is configured by the resistance value in accordance with the result expressed below.

The resistance value=(the voltage difference generated by the voltage-regulating unit)/(the operating current required by the LEDs)

Due to the load module 100 and the LED module 200 of the present invention, the configuration of the light source device can be easily optimized in accordance with the operating current required by the LED string 210 in its entirety and the voltage difference of the load module 100. For example, when a voltage source of 24V is provided and an operating voltage of 3.3V is required for the LED string 210 composed of six LEDs connected in series, the load module 100 can be designed in a manner to generate a stable voltage difference of 1V so that, given a predetermined operating current of 0.1 A of the LEDs, the constant current controlling unit 120 can be configured to generate a resistance value of 10.0 to enable the load module 100 to output a stable current of 0.1 A; at this point in time, the amount by which the residual voltage (23V) exceeds the operating voltage (19.8V) required by the LED string 210 in its entirety equals 3.2V and therefore does not exceed the safe voltage value (10V).

Figure 3:
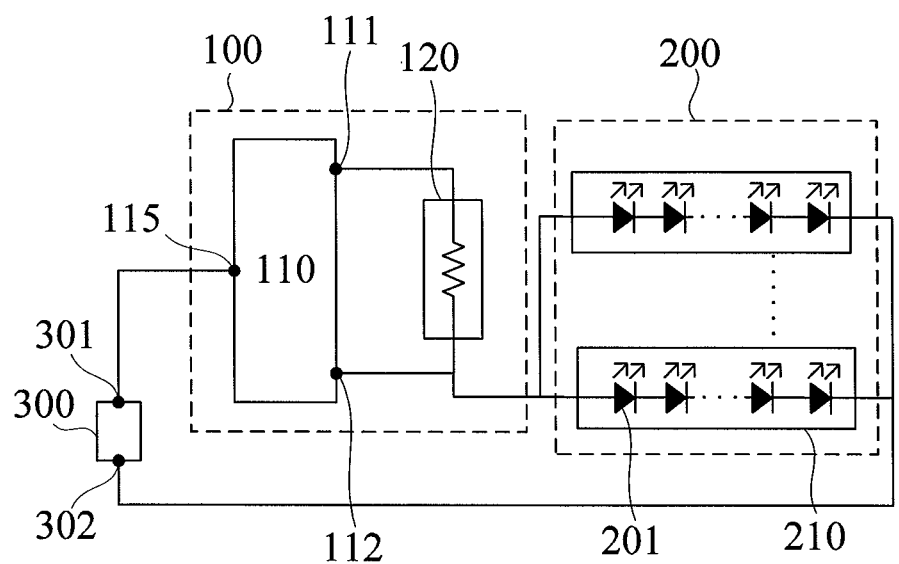
FIG. 3 is a schematic view of a light source device with a plurality of LED strings according to an embodiment of the present invention.

Referring to FIG. 3, there is shown a schematic view of a light source device with a plurality of LED strings according to an embodiment of the present invention. FIG. 3 is illustrative of an embodiment in which the LED module 200 has a plurality of LED strings 210, wherein the LED strings 210 are connected in parallel.

In conclusion, a light source device with an LED module provided by the present invention has the following advantages: in case of a change of a voltage source, a voltage-regulating unit of a load module can still generate a stable voltage difference and thus generate a stable current to allow the LED module to emit light steadily, thereby preventing the LED module from incurring overcurrent-induced damage.

The present invention is disclosed above by preferred embodiments. Nonetheless, persons skilled in the art understand that the preferred embodiments are illustrative of the present invention only and are not to be interpreted as restrictive of the scope of the present invention. Equivalent modifications and replacements made to the aforesaid embodiments should fall within the scope of the present invention. Therefore, the legal protection for the present invention should be defined by the appended claims.

What is claimed is:

1. A light source device with a light-emitting diode module (LED module), comprising:

a load module comprising a voltage-regulating unit and a constant current controlling unit parallel-connected between a first output end and a second output end of the voltage-regulating unit, wherein an input end of the voltage-regulating unit is connected to a positive end of a voltage source, and the voltage-regulating unit generates a stable voltage difference between the first output end and the second output end, the voltage difference being less than 1.6V; and the LED module connected between the second output end of the voltage-regulating unit and a negative end of the voltage source to receive a residual voltage equal to a result of subtracting from the output voltage of the voltage source the voltage difference consumed by the load module, wherein the LED module has at least an LED string including a plurality of LEDs connected in series, wherein an operating voltage required for the at least an LED string in its entirety is less than or equal to the residual voltage, wherein an amount by which the residual voltage exceeds the operating voltage required for the at least an LED string in its entirety does not exceed a safe voltage value, wherein the constant current controlling unit provides a resistance value, such that the constant current controlling unit is configured by the resistance value as follows:

the resistance value=(the voltage difference generated by the voltage-regulating unit)/(the operating current required by the LEDs).

2. The light source device of claim 1, wherein the safe voltage value equals 10V.

3. The light source device of claim 1, wherein the voltage-regulating unit is a low-dropout (LDO) regulator.

4. The light source device of claim 3, wherein the constant current controlling unit is a resistor.

5. The light source device of claim 4, wherein the safe voltage value equals 10V.

6. The light source device of claim 5, the voltage difference being less than 1.1V.

7. The light source device of claim 3, wherein the LED module has a plurality of LED strings connected in parallel.

8. The light source device of claim 7, wherein the safe voltage value equals 10V.

9. The light source device of claim 8, the voltage difference being less than 1.1V.

* * * * *